United States Patent
Praetorius et al.

(10) Patent No.: US 11,801,490 B2
(45) Date of Patent: Oct. 31, 2023

(54) METHODS OF PREPARING A CATALYST

(71) Applicant: Chevron Phillips Chemical Company LP, The Woodlands, TX (US)

(72) Inventors: Jeremy M. Praetorius, Bartlesville, OK (US); Eric D. Schwerdtfeger, Bartlesville, OK (US); Max P. McDaniel, Bartlesville, OK (US); Ted H. Cymbaluk, Seabrook, TX (US); Connor D. Boxell, Tulsa, OK (US); Alan L Solenberger, Bartlesville, OK (US); Kathy S. Clear, Bartlesville, OK (US)

(73) Assignee: Chevron Phillips Chemical Company LP, The Woodlands, TX (US)

( * ) Notice: Subject to any disclaimer, the term of this patent is extended or adjusted under 35 U.S.C. 154(b) by 0 days.

(21) Appl. No.: 17/699,366

(22) Filed: Mar. 21, 2022

(65) Prior Publication Data

US 2022/0203333 A1   Jun. 30, 2022

Related U.S. Application Data

(62) Division of application No. 16/237,011, filed on Dec. 31, 2018, now Pat. No. 11,331,650, which is a
(Continued)

(51) Int. Cl.
*B01J 23/26* (2006.01)
*C08F 10/02* (2006.01)
(Continued)

(52) U.S. Cl.
CPC ............... *B01J 23/26* (2013.01); *B01J 21/08* (2013.01); *B01J 35/1019* (2013.01);
(Continued)

(58) Field of Classification Search
CPC ........ B01J 23/26; B01J 23/00; B01J 35/1019; B01J 35/1023; B01J 37/1047; B01J 21/00;
(Continued)

(56) References Cited

U.S. PATENT DOCUMENTS 2,503,913 A   4/1950   Kimberlin, Jr.
3,119,569 A   1/1964   Baricordi
(Continued)

FOREIGN PATENT DOCUMENTS

CN   1720269 A   1/2006
EA   015825 B1   12/2011
(Continued)

OTHER PUBLICATIONS

Bird, R. Byron, et al., "Dynamics of Polymeric Liquids," Fluid Mechanics, vol. 1, Second Edition, 1987, cover page, publishing page, pp. xiii-xviii, and 171-172, John Wiley & Sons, Inc.
(Continued)

*Primary Examiner* — Smita S Patel
(74) *Attorney, Agent, or Firm* — Conley Rose, P.C.

(57) ABSTRACT

A method comprising a) drying a support material comprising silica at temperature in the range of from about 150° C. to about 220° C. to form a dried support; b) contacting the dried support with methanol to form a slurried support; c) subsequent to b), cooling the slurried support to a temperature of less than about 60° C. to form a cooled slurried support; d) subsequent to c), contacting the cooled slurried support with a titanium alkoxide to form a titanated support; and e) thermally treating the titanated support by heating to a temperature of equal to or greater than about 150° C. for a time period of from about 5 hours to about 30 hours to remove the methanol and yield a dried titanated support.

19 Claims, 1 Drawing Sheet

Related U.S. Application Data division of application No. 14/858,512, filed on Sep. 18, 2015, now Pat. No. 10,213,766.

(51) Int. Cl.
| | |
|---|---|
| *B01J 21/08* | (2006.01) |
| *B01J 35/10* | (2006.01) |
| *B01J 37/02* | (2006.01) |
| *B01J 37/08* | (2006.01) |
| C08F 110/02 | (2006.01) |

(52) U.S. Cl.
CPC ....... *B01J 35/1023* (2013.01); *B01J 35/1047* (2013.01); *B01J 37/0203* (2013.01); *B01J 37/0236* (2013.01); *B01J 37/08* (2013.01); *C08F 10/02* (2013.01); *C08F 110/02* (2013.01)

(58) Field of Classification Search
CPC . B01J 21/06; B01J 21/063; B01J 21/08; B01J 37/0203; B01J 37/0236; B01J 37/08; C08F 110/02; C08F 10/02; C08F 4/22; C08F 4/025; C08F 4/16; C08F 2500/12
See application file for complete search history.

(56) References Cited

U.S. PATENT DOCUMENTS

| | | |
|---|---|---|
| 3,248,179 A | 4/1966 | Norwood |
| 3,622,521 A | 11/1971 | Hogan |
| 3,704,287 A | 11/1972 | Johnson |
| 3,780,011 A | 12/1973 | Tus |
| 3,875,079 A | 4/1975 | Witt |
| 3,882,096 A | 5/1975 | Shida |
| 3,887,494 A | 6/1975 | Dietz |
| 3,900,457 A | 8/1975 | Witt |
| 3,970,613 A | 7/1976 | Goldie et al. |
| 3,976,632 A | 8/1976 | Delap |
| 4,041,224 A | 8/1977 | Hoff |
| 4,053,436 A | 10/1977 | Hogan |
| 4,119,569 A | 10/1978 | Dietz |
| 4,169,926 A | 10/1979 | McDaniel |
| 4,190,457 A | 2/1980 | McDaniel |
| 4,218,345 A | 8/1980 | Hoff |
| 4,247,421 A | 1/1981 | McDaniel |
| 4,280,141 A | 7/1981 | McCann |
| 4,294,724 A | 10/1981 | McDaniel |
| 4,296,001 A | 10/1981 | Hawley |
| 4,299,731 A | 11/1981 | McDaniel |
| 4,305,841 A | 12/1981 | Gutweiler |
| 4,312,967 A | 1/1982 | Norwood |
| 4,345,055 A | 8/1982 | Hawley |
| 4,368,303 A | 1/1983 | McDaniel |
| 4,402,864 A | 9/1983 | McDaniel |
| 4,405,501 A | 9/1983 | Witt |
| 4,405,768 A | 9/1983 | McDaniel |
| 4,424,320 A | 1/1984 | McDaniel |
| 4,434,243 A | 2/1984 | Martin |
| 4,442,275 A | 4/1984 | Martin |
| 4,446,243 A | 5/1984 | Chester et al. |
| 4,501,885 A | 2/1985 | Sherk |
| 4,547,557 A | 10/1985 | McDaniel |
| 4,559,394 A | 12/1985 | McDaniel |
| 4,588,790 A | 5/1986 | Jenkins, III |
| 4,832,022 A | 5/1989 | Tjulkov |
| 4,981,831 A | 1/1991 | Knudsen |
| 5,115,053 A | 5/1992 | Knudsen |
| 5,183,792 A | 2/1993 | Wang |
| 5,231,066 A | 7/1993 | Rekers |
| 5,284,926 A | 2/1994 | Benham |
| 5,352,749 A | 10/1994 | Dechellis |
| 5,426,082 A | 6/1995 | Marsden |
| 5,436,304 A | 7/1995 | Griffin |
| 5,455,314 A | 10/1995 | Burns |
| 5,478,898 A | 12/1995 | Standaert |
| 5,565,175 A | 10/1996 | Hottovy |
| 5,575,979 A | 11/1996 | Hanson |
| 5,576,262 A | 11/1996 | Denton |
| 5,599,762 A | 2/1997 | Denton |
| 5,914,291 A | 6/1999 | Marsden |
| 5,965,675 A | 10/1999 | Kellum |
| 6,200,920 B1 | 3/2001 | Debras |
| 6,239,235 B1 | 5/2001 | Hottovy |
| 6,262,191 B1 | 7/2001 | Hottovy |
| 6,423,663 B2 | 7/2002 | Debras |
| 6,482,901 B1 | 11/2002 | Debras |
| 6,489,428 B1 | 12/2002 | Debras |
| 6,657,023 B2 | 12/2003 | Bergmeister |
| 6,707,498 B1 | 3/2004 | Toma |
| 6,833,415 B2 | 12/2004 | Kendrick |
| 6,855,781 B2 | 2/2005 | Bergmeister |
| 7,019,089 B2 | 3/2006 | Schneider |
| 7,088,394 B2 | 8/2006 | Rossi |
| 7,262,259 B2 | 8/2007 | Katzen |
| 7,375,169 B1 | 5/2008 | Smith |
| 7,390,395 B2 | 6/2008 | Elomari |
| 7,700,516 B2 | 4/2010 | McDaniel |
| 7,803,736 B2 | 9/2010 | Rohde |
| 7,981,832 B2 | 7/2011 | Mcdaniel |
| 8,183,173 B2 | 5/2012 | Mcdaniel |
| 8,367,785 B2 | 2/2013 | Chamayou |
| 8,372,771 B2 | 2/2013 | Benham |
| 9,023,967 B2 | 5/2015 | Yu |
| 9,096,699 B2 | 8/2015 | Mcdaniel |
| 9,243,091 B2 | 1/2016 | Moineau |
| 9,587,048 B2 | 3/2017 | Praetorius |
| 9,598,513 B2 | 3/2017 | Yu |
| 9,796,798 B2 | 10/2017 | Praetorius |
| 9,879,101 B2 | 1/2018 | Yu |
| 9,988,468 B2 | 6/2018 | Mcdaniel |
| 10,213,766 B2 | 2/2019 | Praetorius |
| 10,287,369 B2 | 5/2019 | Schwerdtfeger |
| 10,323,108 B2 | 6/2019 | Yu |
| 10,323,109 B2 | 6/2019 | Mcdaniel |
| 10,513,570 B2 | 12/2019 | Mcdaniel |
| 10,543,480 B2 | 1/2020 | Mcdaniel |
| 2003/0007083 A1 | 1/2003 | Rossi |
| 2004/0026324 A1 | 2/2004 | Luca |
| 2005/0153830 A1 | 7/2005 | Jensen |
| 2005/0192177 A1 | 9/2005 | Roger |
| 2005/0272886 A1 | 12/2005 | Cann |
| 2006/0155082 A1 | 7/2006 | McDaniel |
| 2006/0172884 A1 | 8/2006 | Schneider |
| 2007/0034549 A1 | 2/2007 | Elomari |
| 2008/0038161 A1 | 2/2008 | Marti |
| 2010/0069585 A1 | 3/2010 | Bodart |
| 2011/0201768 A1 | 8/2011 | Benham |
| 2013/0137839 A1 | 5/2013 | Yu |
| 2013/0144017 A1 | 6/2013 | Mcdaniel |
| 2014/0275457 A1 | 9/2014 | Mcdaniel |
| 2014/0295178 A1 | 10/2014 | Watanabe |
| 2015/0065667 A1 | 3/2015 | Cheng |
| 2015/0203614 A1 | 7/2015 | Yu |
| 2017/0145124 A1 | 5/2017 | Yu |
| 2019/0134610 A1 | 5/2019 | Praetorius |
| 2019/0314787 A1 | 10/2019 | Mcdaniel |

FOREIGN PATENT DOCUMENTS

| | | |
|---|---|---|
| EP | 0033953 A2 | 8/1981 |
| EP | 0088989 A2 | 9/1983 |
| EP | 0314385 A2 | 5/1989 |
| EP | 0085857 B1 | 8/1989 |
| EP | 0337365 A2 | 10/1989 |
| EP | 0439294 A1 | 7/1991 |
| EP | 0339571 B1 | 2/1994 |
| EP | 0589643 A1 | 3/1994 |
| EP | 0455444 B1 | 10/1997 |
| EP | 0962469 A1 | 12/1999 |
| EP | 0882744 B1 | 7/2003 |
| EP | 0882743 B1 | 11/2003 |
| EP | 1845110 A1 | 10/2007 |
| EP | 2606962 A1 | 6/2013 |

(56) References Cited

FOREIGN PATENT DOCUMENTS

| | | |
|---|---|---|
| GB | 1197069 A | 7/1970 |
| GB | 1369485 A | 10/1974 |
| GB | 1405721 A | 9/1975 |
| GB | 1415649 A | 11/1975 |
| GB | 1447605 A | 8/1976 |
| GB | 1575419 A | 9/1980 |
| JP | 2011117006 A | 6/2011 |
| KR | 20050069178 A | 7/2005 |
| KR | 20070015410 A | 2/2007 |
| KR | 101941732 B1 | 4/2019 |
| SU | 940634 A3 | 6/1982 |
| SU | 1033504 A1 | 8/1983 |
| WO | 1993011173 A1 | 6/1993 |
| WO | 2002002652 A2 | 1/2002 |
| WO | 2003033530 A2 | 4/2003 |
| WO | 2004052948 A1 | 6/2004 |
| WO | 2005103100 A1 | 11/2005 |
| WO | 2009042149 A2 | 4/2009 |
| WO | 2009045215 A1 | 4/2009 |
| WO | 2010034464 A1 | 4/2010 |
| WO | 2012040144 A1 | 3/2012 |
| WO | 2013081826 A1 | 6/2013 |
| WO | 2013082346 A2 | 6/2013 |
| WO | 2016176189 A1 | 11/2016 |
| WO | 2017018930 A1 | 2/2017 |
| WO | 2018064050 A2 | 4/2018 |
| WO | 2018125690 A1 | 7/2018 |
| WO | 2018194881 A1 | 10/2018 |

OTHER PUBLICATIONS

Bouh, Abdillahi Omar, et al., "Mono- and dinuclear silica-supported titanium(IV) complexes and the effect of TiOTi connectivity on reactivity," J. Am. Chem. Soc., 1999, pp. 7201-7210, vol. 121, American Chemical Society.

Conway, Steven J., et al., "Chromia/silica-titania cogel catalysts for ethene polymerisation," J. Chem. Soc., Faraday Trans., 1989, pp. 1841-1851, vol. 85, No. 7.

Conway, Steven J., et al., "Chromia/silica-titania cogel catalysts for ethene polymerisation," J. Chem. Soc., Faraday Trans., 1989, pp. 71-78, vol. 85, No. 1.

Conway, Steven J., et al., "Chromia/silica-titania cogel catalysts for ethene polymerisation," J. Chem. Soc., Faraday Trans., 1989, pp. 79-90, vol. 85, No. 1.

Ellison, Alan, et al., "Characterisation of cr/silica catalysts," J. Chem. Soc. Faraday Trans., 1993, pp. 4393-4395, vol. 89, No. 24.

Ellison, Alan, et al., "Characterisation of modified cr-silica catalysts," Journal of Molecular Catalysis, 1994, pp. 81-86, vol. 90, Elsevier Science B.V.

Hieber, C. A., et al., "Shear-rate-dependence modeling of polymer melt viscosity," Polymer Engineering and Science, Jul. 1992, pp. 931-938, vol. 32, No. 14.

Hieber, C. A., et al., "Some correlations involving the shear viscosity of polystyrene melts," Rheol Acta, 1989, pp. 321-332, vol. 28.

Iler, Ralph K., "The Chemistry of Silica: Solubility, Polymerization, Colloid and Surface Properties and Biochemistry of Silica," 1979, 1 page, Wiley.

M.P. McDaniel, "The State of Cr(VI) on the Phillips Polymerization Catalyst IV. Saturation Coverage," Journal of Catalysis, vol. 76, p. 37, 1982.

Mabilon, G., et al., "Copolymerisation ethylene-propylene par des catalyseurs a l'oxyde de chrome," Eur. Polym. J., 1985, pp. 245-249, vol. 21, No. 3, Pergamon Press Ltd., Great Britain.

McDaniel, M. P., et al., "Activation of Phillips Cr/silica catalysts IV. Mobility of Cr(VI)," Journal of Catalysis, 2007, pp. 281-295, vol. 252, Academic Press, Inc.

McDaniel, M. P., et al., "The activation of the phillips polymerization catalyst," Journal of Catalysis, 1983, pp. 118-126, vol. 82, Academic Press, Inc.

McDaniel, M. P., et al., The State of Cr(VI) on the Phillips Polymerization Catalyst, Journal of Catalysis, 1982, pp. 29-36, vol. 76, Academic Press, Inc.

Niemanstverdriet, J.W., "Spectroscopy in Catalysis: An Introduction," Jul. 11, 2008, 3rd Edition, pp. 251-295, Section 9.5, Wiley-VCH.

Product Information, "LUDOX ® SM-AS Colloidal Silica," 2005, W. R. Grace & Co.-Conn., 2 pages.

Pullukat, T. J., et al., "A chemical study of thermally activated chromic titanate on silica ethylene polymerization catalysts," Journal of Polymer Science: Polymer Chemistry Edition, 1980, pp. 2857-2866, vol. 18, John Wiley & Sons, Inc.

Pullukat, Thomas J., et al., "Titanium modified chromium catalysts for ethylene polymerization," Symposium on Transition Metal Catalysts Polymerization, Michigan Molecular Institute, Aug. 1981, pp. 697-712.

Rebenstorf, B., et al., "Influence of chromium concentration and addition of fluorine, titanium, or boron on the chromium species of the phillips catalyst: a quantitative evaluation," Langmuir, 1991, pp. 2160-2165, vol. 7, American Chemical Society.

Youlu Yu, et al., "SEC-MALS Method for the Determination of Long-Chain Branching and Long-Chain Branching Distribution in Polyethylene," Science Direct, Polymer vol. 46, 2005, pp. 5165-5182.

Yu, Youlu, et al., "Size-exclusion chromatography coupled to multiangle light scattering detection of long-chain branching in polyethylene made with phillips catalyst," Journal of Polymer Science Part A: Polymer Chemistry, 2012, vol. 50, pp. 1166-1173, Wiley Periodicals, Inc.

Search Report issued in related Chinese Application No. 2021102627667, dated Sep. 5, 2022. 2 pp.

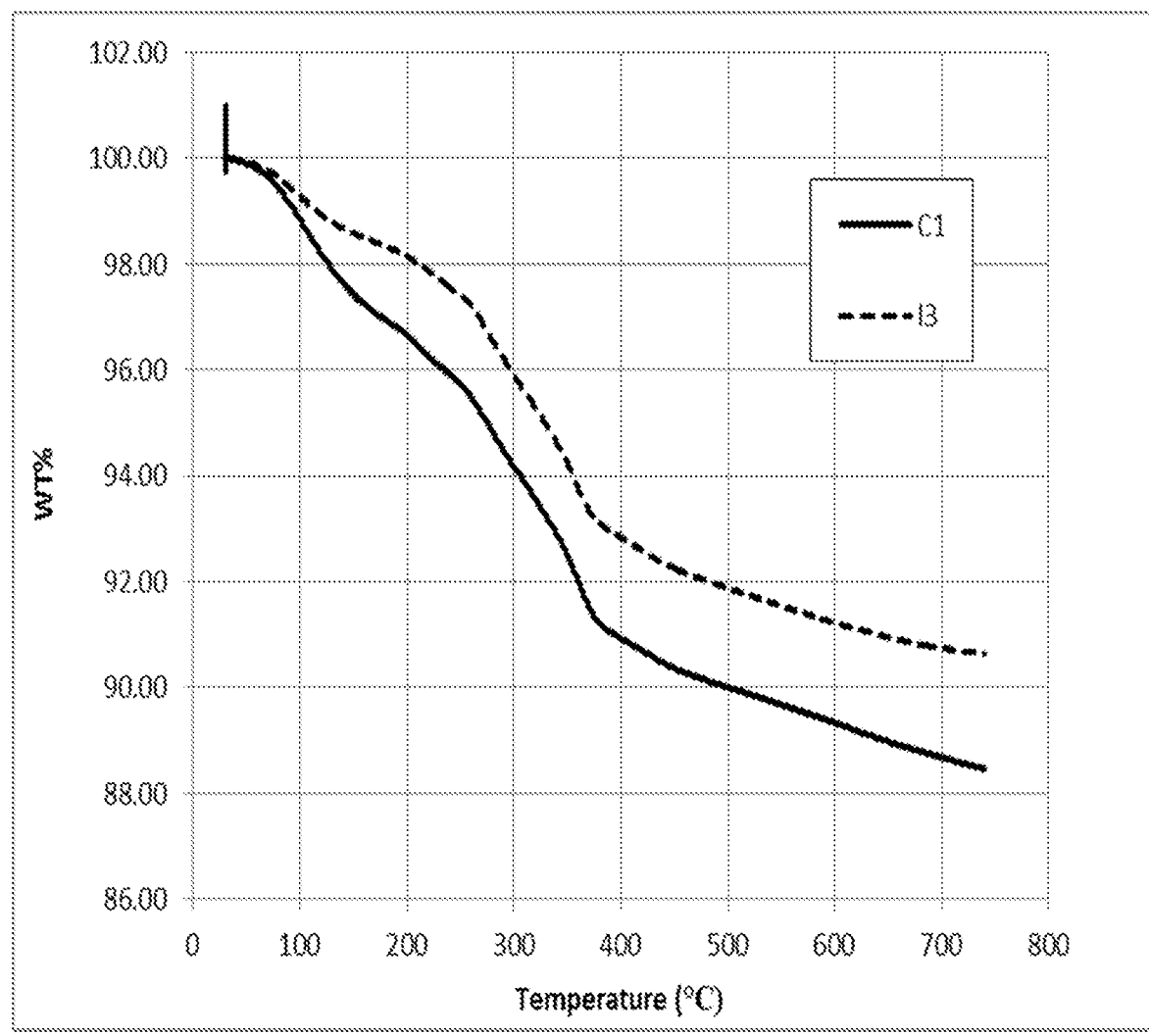

METHODS OF PREPARING A CATALYST

CROSS-REFERENCE TO RELATED APPLICATIONS

This application is a divisional of and claims priority to U.S. patent application Ser. No. 16/237,011 filed Dec. 31, 2018, published as U.S. Patent Application Publication No. 2019/0134610 A1, which is a divisional of and claims priority to U.S. patent application Ser. No. 14/858,512 filed Sep. 18, 2015, now U.S. Pat. No. 10,213,766 B2, both entitled "Methods of Preparing a Catalyst," both of which are incorporated by reference herein in their entirety.

TECHNICAL FIELD

The present disclosure relates to catalyst compositions. More specifically, the present disclosure relates to methods of preparing olefin polymerization catalyst compositions.

BACKGROUND

Enhancements in preparation methods for olefin polymerization catalysts can reduce the costs associated with catalyst production and improve process economics. Thus, there is an ongoing need to develop new methods of preparing olefin polymerization catalysts.

SUMMARY

Disclosed herein is a method comprising a) drying a support material comprising silica at temperature in the range of from about 150° C. to about 220° C. to form a dried support; b) contacting the dried support with methanol to form a slurried support; c) subsequent to b), cooling the slurried support to a temperature of less than about 60° C. to form a cooled slurried support; d) subsequent to c), contacting the cooled slurried support with a titanium alkoxide to form a titanated support; and e) thermally treating the titanated support by heating to a temperature of equal to or greater than about 150° C. for a time period of from about 5 hours to about 30 hours to remove the methanol and yield a dried titanated support.

Also disclosed herein is a method comprising: a) drying a silica support material at temperature in the range of from about 150° C. to about 220° C. to form a dried support; b) contacting the dried support with a solution comprising methanol containing less than 0.1 wt. % water and basic chromium acetate to form a chrominated, slurried support; c) cooling the chrominated, slurried support to a temperature of less than about 60° C. to form a cooled slurried support; d) contacting the cooled slurried support with titanium n-propoxide to form a titanated slurried support; e) thermally treating the titanated slurried support by increasing the temperature of the titanated support to 60° C. to 70° C.; f) prior to complete removal of methanol, contacting the titanated slurried support with water in an amount ranging from about 0.1 moles to about 10 moles per mole of titanium to produce a mixture; g) thermally treating the mixture by heating the mixture to a temperature of about 150° C. to about 220° C. for a time period of from about 5 hours to about 30 hours to form a precatalyst; and h) calcining the precatalyst at a temperature in the range of from about 400° C. to about 1000° C. for a time period of from about 30 minutes to about 24 hours to form a polymerization catalyst.

Also disclosed herein is a method comprising a) drying a silica support at temperature in the range of from about 150° C. to about 220° C. to form a dried support; b) contacting the dried support with a chromium-containing compound to form a chrominated support; c) contacting the chrominated support with a solvent to form a slurried support; d) cooling the slurried support to a temperature of less than about 60° C. to form a cooled support; e) contacting the cooled support with a titanium-containing compound to form a titanated support; f) thermally treating the titanated support by increasing the temperature of the titanated support to the boiling point of the solvent; g) prior to reaching the boiling point of the solvent, contacting the titanated support with water in an amount ranging from about 0.1 moles to about 10 moles per mole of titanium to produce a mixture; h) thermally treating the mixture by heating the mixture to a temperature of about 150° C. for a time period of from about 5 hours to about 30 hours to form a precatalyst; and i) calcining the precatalyst at a temperature in the range of from about 400° C. to about 1000° C. for a time period of from about 30 minutes to about 24 hours to form a polymerization catalyst.

BRIEF DESCRIPTION OF THE DRAWINGS

The FIGURE depicts a thermogravimetric analysis of the samples of example 2.

DETAILED DESCRIPTION

Disclosed herein are methods for the preparation of a polymerization catalyst. In an embodiment, the method comprises contacting a silica-support, titanium alkoxide, and basic chromium acetate under conditions suitable for the formation of a polymerization catalyst. In an embodiment, a polymerization catalyst produced as disclosed herein results in lower emissions of volatile organic compounds (VOCs) during production (e.g., activation via calcination) when compared to an otherwise similar catalyst and are designated lower emitting catalysts (LECs).

In an embodiment, a LEC comprises a silica-support. A silica-support suitable for use in the present disclosure may have a surface area and pore volume effective to provide for the production of an active catalyst (e.g., a LEC). In an embodiment, the silica-support possesses a surface area in the range of from about 250 m$^2$/gram to about 1000 m$^2$/gram, alternatively from about 250 m$^2$/gram to about 700 m$^2$/gram, alternatively from about 250 m$^2$/gram to about 600 m$^2$/gram, or alternatively greater than 250 m$^2$/gram. The silica-support may be further characterized by a pore volume of greater than about 1.0 cm$^3$/gram, or alternatively greater than about 1.5 cm$^3$/gram. In an embodiment, the silica-support is characterized by a pore volume ranging from about 1.0 cm$^3$/gram to about 2.5 cm$^3$/gram. The silica-support may be further characterized by an average particle size of from about 10 microns to about 500 microns, alternatively about 25 microns to about 300 microns, or alternatively about 40 microns to about 150 microns. Generally, the average pore size of the silica-support ranges from about 10 Angstroms to about 1000 Angstroms. In one embodiment, the average pore size of the silica-support material is in the range of from about 50 Angstroms to about 500 Angstroms, while in yet another embodiment the average pore size ranges from about 75 Angstroms to about 350 Angstroms.

The silica-support may contain greater than about 50 percent (%) silica, alternatively greater than about 80% silica, alternatively greater than about 95% silica by weight of the silica-support material. The silica-support may be prepared using any suitable method, for example the silica-support may be prepared synthetically by hydrolyzing tetrachlorosilane ($SiCl_4$) with water or by contacting sodium silicate with a mineral acid. An example of silica-support suitable for use in this disclosure includes without limitation ES70 which is a silica-support material with a surface area of 300 $m^2/g$, and a pore volume of 1.6 cc/g that is commercially available from PQ Corporation. The silica-support may include additional components that do not adversely affect the LEC, such as zirconia, alumina, thoria, magnesia, fluoride, sulfate, phosphate, or mixtures thereof.

The silica-support may be present in the LEC in an amount of from about 50 weight percent (wt. %) to about 99 wt. %, or alternatively from about 80 wt. % to about 99 wt. %. Herein the percentage of silica-support refers to the final weight percent of silica-support associated with the catalyst by total weight of the catalyst after all processing steps (e.g., after final activation via calcination).

In an embodiment, a LEC comprises titanium. The source of the titanium may be a titanium-containing compound such as a titanium tetraalkoxide. In an embodiment, the titanium-containing compound is titanium n-propoxide $Ti(OnPr)_4$.

The amount of titanium present in the LEC may range from about 0.1 wt. % to about 10 wt. % titanium by weight of the LEC, alternatively from about 0.5 wt. % to about 5 wt. % titanium, alternatively from about 1 wt. % to about 4 wt. %, or alternatively from about 2 wt. % to about 4 wt. %. In another embodiment, the amount of titanium may range from about 1 wt. % to about 5 wt. %. Herein, the percentage titanium refers to the final weight percent titanium associated with the catalyst composition by total weight of the catalyst composition after all processing steps (e.g., after final activation via calcination).

In an embodiment, a LEC comprises chromium. The source of the chromium may be any chromium-containing compound that is substantially soluble in methanol. Herein, "substantially soluble" refers to a solubility of at least 0.1 grams/liter. Nonlimiting examples of chromium-containing compounds suitable for use in the present disclosure include basic chromium acetate, chromium acetate, chromium (III) nitrate nonahydrate, chromium trioxide, and t-butyl chromate. In an embodiment, the LEC comprises basic chromium acetate.

The amount of chromium present in the catalyst may range from about 0.1 wt. % to about 10 wt. % by weight of the LEC, alternatively from about 0.25 wt. % to about 3 wt. %, or alternatively from about 0.5 wt. % to about 1.5 wt. %. Herein, the percentage chromium refers to the final percent chromium associated with the support material by total weight of the material after all processing steps (e.g., after final activation via calcination).

In an embodiment, a method for preparation of a LEC comprises drying the silica-support. Drying of the silica-support can be carried out in a temperature range of from about 150° C. to about 500° C., alternatively from about 150° C. to about 300° C., or alternatively from about 150° C. to about 220° C. for a time period ranging from about 5 hours to about 24 hours, or alternatively from about 5 hours to about 12 hours. Drying of the support material may be carried out in an inert atmosphere (e.g. under vacuum, He, Ar, or nitrogen gas). The resulting material is termed a dried support. The dryness of the silica-support can be measured as loss in weight upon drying at a temperature of 250° C. In an embodiment, the loss on drying of the dried support is less than about 3 wt. %, alternatively less than about 2 wt. %, or alternatively less than about 1 wt. %.

In an embodiment, the method for preparation of a LEC further comprises slurrying the dried support with dry methanol. Herein, "dry methanol" refers to methanol having a water content of less than about 0.1 wt. %. The dried support may be slurried by contact with dry methanol in an amount that ranges from about 1 to about 10 times the total weight of the dried support, or alternatively from about 2 to about 3 times the total weight of the dried support. The resulting material is termed a slurried dried support.

In an embodiment, the method for preparation of a LEC further comprises cooling the slurried dried support. The slurried dried support may be cooled to a temperature of less than about 80° C., alternatively less than about 60° C., or alternatively less than about 50° C. The resulting material is termed a cooled slurried dried support.

In an embodiment, the method for preparation of a LEC further comprises addition of a titanium alkoxide, to the cooled slurried dried support to produce a titanated cooled slurried dried support. The titanium alkoxide may comprise equal to or less than twenty-four carbon atoms. Nonlimiting examples of titanium alkoxides suitable for use in the present disclosure include titanium alkoxides comprising linear alkyl chains. In an embodiment, the titanium alkoxide excludes branched alkyl chains. In an embodiment, the titanium alkoxide comprises titanium n-propoxide (i.e., $Ti(OnPr)_4$), titanium n-butoxide (i.e., $Ti(OnBu)_4$), or combinations thereof. Titanium may be directly added to the cooled slurried dried support with vigorous mixing such that the titanium is efficiently dispersed throughout the slurry. Upon addition of the titanium alkoxide to the cooled slurried dried support the resulting mixture may be stirred at ambient temperature for a time period ranging from about 5 minutes to about 30 hours, alternatively from about 15 minutes to about 12 hours, or alternatively from about 30 minutes to about 5 hours.

In an embodiment, the method for preparation of a LEC further comprises addition of a chromium-containing compound (e.g., basic chromium acetate) to the titanated cooled slurried dried support. The resulting material is termed a metallated slurried support.

In an embodiment, the method for preparation of a LEC further comprises addition of a chromium-containing compound (e.g., basic chromium acetate) to the cooled slurried dried support. The resulting material is termed a chrominated cooled slurried dried support. The chrominated cooled slurried dried support may then be contacted with a titanium containing compound (e.g, $Ti(OnPr)_4$) as disclosed herein to produce a titanated chrominated cooled slurried dried support.

In an alternative embodiment, the method for preparation of a LEC may comprise addition of a chromium-containing compound (e.g., basic chromium acetate) to the dried support to result in a chrominated dried support. The chrominated dried support may then be slurried to produce a slurried chrominated dried support. The slurried chrominated dried support may then be cooled as described herein to produce a cooled slurried chrominated dried support. The cooled slurried chrominated dried support may then be contacted with a titanium containing compound (e.g, $Ti(OnPr)_4$) as disclosed herein to produce a titanated cooled slurried chrominated dried support.

In yet another embodiment, the method for preparation of a LEC further comprises addition of a chromium-containing compound (e.g., basic chromium acetate) to the slurried dried support resulting in a chrominated slurried dried support. The chrominated slurried dried support may subsequently be cooled as described herein to produce a cooled chrominated slurried dried support. The cooled chrominated slurried dried support may then be contacted with a titanium containing compound (e.g, Ti(OnPr)$_4$) as disclosed herein to produce a titanated cooled chrominated slurried dried support.

Herein, chrominated titanated cooled slurried dried support, titanated chrominated cooled slurried dried support, titanated cooled slurried chrominated dried support, and titanated cooled chrominated slurried dried support are collectively referred to as metallated supports.

In each of the foregoing embodiments that result in the production of a metallated support, it is to be understood that processing conditions similar to those previously disclosed herein (e.g., mixing times, stirring times, heating times, cooling times, cooling temperatures, etc.) can be applied. In an embodiment, for each of the disclosed methods of preparation of a metallated support the processing conditions described herein are applied.

In various embodiments, the chromium-containing compound (e.g., basic chromium acetate) may be added at any point in the process after drying the silica and prior to complete removal of the methanol. In some embodiments, the chromium-containing compound (e.g., basic chromium acetate) can be dissolved in the methanol solvent before slurrying the silica.

In an embodiment, a method of preparing a LEC further comprises subjecting the metallated slurried support to a thermal treatment. In an embodiment, the thermal treatment comprises heating the metallated slurried support to a temperature near the boiling point of methanol (i.e., from about 60° C. to about 70° C.). The method of the present disclosure further comprises the addition of water to the metallated slurried support prior to and/or during thermal treatment and prior to the complete removal of the methanol. Herein, "complete removal" of the removal of the methanol refers to less than about 10 volume percent (10 vol. %) of the original methanol volume remaining, alternatively less than about 9 vol. %, alternatively less than about 8 vol. %, alternatively less than about 7 vol. %, alternatively less than about 6 vol. %, alternatively less than about 5 vol. %, alternatively less than about 4 vol. %, alternatively less than about 3, alternatively less than about 2 vol. %, or alternatively less than about 1 vol. %. Water may be added to the metallated slurried support in an amount ranging from about 0.1 mole to about 10 moles per mole of titanium, alternatively from about 1 mole to about 8 moles, or alternatively from about 2 moles to about 5 moles. The material resulting from the addition of water and heating to from about 60° C. to about 70° C. is termed the hydrated metallated support.

In an embodiment, the metallated slurried support may be subjected to thermal treatment at a temperature of at least about 150° C., alternatively from about 150° C. to about 300° C., or alternatively from about 150° C. to about 220° C. for a time period of from about 5 hours to about 30 hours, or alternatively from about 5 hours to about 15 hours, or alternatively from about 5 hours to about 8 hours. In an embodiment, water may be added to the metallated slurried support at any point after the addition of titanium to also produce a hydrated metallated support. The water may be added in any form, i.e. solid, liquid, vapor, or solution.

The hydrated metallated support may then be subjected to further thermal treatment at a temperature of at least about 150° C., alternatively from about 150° C. to about 300° C., or alternatively from about 150° C. to about 220° C. for a time period of from about 5 hours to about 30 hours, or alternatively from about 5 hours to about 15 hours, or alternatively from about 5 hours to about 8 hours. The resulting material is termed the dried precatalyst.

In an embodiment, the dried precatalyst is heat treated (i.e., calcined) to form a LEC. Heat treatment of the dried precatalyst may be carried out using any suitable method, e.g., fluidization. Without wishing to be limited by theory, heat treatment of the dried precatalyst may result in an increase in the amount of hexavalent chromium present in the catalyst. In an embodiment, heat treatment of the dried precatalyst is carried out in any suitable atmosphere, such as air, oxygen, inert gases (e.g., Ar), or carbon monoxide by heating to a temperature of from about 400° C. to about 1000° C., alternatively from about 450° C. to about 900° C., alternatively from about 500° C. to about 800° C., or alternatively from about 500° C. to about 700° C. Heat treatment may be carried out for a period of time ranging from about 30 minutes to about 24 hours, alternatively from about 1 hour to about 12 hours, or alternatively from about 4 hours to about 12 hours.

In an embodiment, one or more of the steps described previously herein for the preparation of a LEC may be carried out in a reactor or reactor system. In an alternative embodiment, one or more of the steps described previously herein for the preparation of a LEC may be carried out outside of a reactor or reactor system. In such embodiments, one or more preparation parameters (e.g., heat treatment of the dried precatalyst) may be adjusted to facilitate formation of the LEC.

In an embodiment, a method of preparing a LEC of the type disclosed herein comprises obtaining a prepared Cr—Si/Ti precatalyst. The prepared Cr—Si/Ti precatalyst may be slurried in methanol to produce a slurried precatalyst. The slurried precatalyst may further be subjected to a thermal treatment. In an embodiment, the thermal treatment comprises heating the slurried precatalyst at a temperature of at least about 150° C., alternatively from about 150° C. to about 300° C., or alternatively from about 150° C. to about 220° C. for a time period of from about 5 hours to about 30 hours, or alternatively from about 5 hours to about 15 hours, or alternatively from about 5 hours to about 8 hours. The resulting material is termed the dried precatalyst. In an embodiment, the dried precatalyst is heat treated (i.e., calcined) to form a LEC.

The method of the present disclosure further comprises the addition of water to the slurried precatalyst. Water may be added to the slurried catalyst in an amount ranging from about 0.1 mole to about 10 moles per mole of titanium, alternatively from about 1 mole to about 8 moles, or alternatively from about 2 moles to about 5 moles. The water may be added in any form, i.e. solid, liquid, vapor, or solution.

The catalysts of the present disclosure (i.e., LECs) are suitable for use in any olefin polymerization method, using various types of polymerization reactors. In an embodiment, a polymer of the present disclosure is produced by any olefin polymerization method, using various types of polymerization reactors. As used herein, "polymerization reactor" includes any reactor capable of polymerizing olefin monomers to produce homopolymers and/or copolymers. Homopolymers and/or copolymers produced in the reactor may be referred to as resin and/or polymers. The various types of reactors include, but are not limited to those that may be referred to as batch, continuous, slurry, gas-phase, solution, high pressure, tubular, autoclave, or other reactor and/or reactors. Gas phase reactors may comprise fluidized bed reactors or staged horizontal reactors. Slurry reactors may comprise vertical and/or horizontal loops. High pressure reactors may comprise autoclave and/or tubular reactors. Reactor types may include batch and/or continuous processes. Continuous processes may use intermittent and/or continuous product discharge or transfer. Processes may also include partial or full direct recycle of un-reacted monomer, un-reacted comonomer, catalyst and/or co-catalysts, diluents, and/or other materials of the polymerization process.

Polymerization reactor systems of the present disclosure may comprise one type of reactor in a system or multiple reactors of the same or different type, operated in any suitable configuration. Production of polymers in multiple reactors may include several stages in at least two separate polymerization reactors interconnected by a transfer system making it possible to transfer the polymers resulting from the first polymerization reactor into the second reactor. Alternatively, polymerization in multiple reactors may include the transfer, either manual or automatic, of polymer from one reactor to subsequent reactor or reactors for additional polymerization. Alternatively, multi-stage or multi-step polymerization may take place in a single reactor, wherein the conditions are changed such that a different polymerization reaction takes place.

The desired polymerization conditions in one of the reactors may be the same as or different from the operating conditions of any other reactors involved in the overall process of producing the polymer of the present disclosure. Multiple reactor systems may include any combination including, but not limited to multiple loop reactors, multiple gas phase reactors, a combination of loop and gas phase reactors, multiple high pressure reactors or a combination of high pressure with loop and/or gas reactors. The multiple reactors may be operated in series or in parallel. In an embodiment, any arrangement and/or any combination of reactors may be employed to produce the polymer of the present disclosure.

According to one embodiment, the polymerization reactor system may comprise at least one loop slurry reactor. Such reactors are commonplace, and may comprise vertical or horizontal loops. Monomer, diluent, catalyst system, and optionally any comonomer may be continuously fed to a loop slurry reactor, where polymerization occurs. Generally, continuous processes may comprise the continuous introduction of a monomer, a catalyst, and/or a diluent into a polymerization reactor and the continuous removal from this reactor of a suspension comprising polymer particles and the diluent. Reactor effluent may be flashed to remove the liquids that comprise the diluent from the solid polymer, monomer and/or comonomer. Various technologies may be used for this separation step including but not limited to, flashing that may include any combination of heat addition and pressure reduction; separation by cyclonic action in either a cyclone or hydrocyclone; separation by centrifugation; or other appropriate method of separation.

Typical slurry polymerization processes (also known as particle-form processes) are disclosed in U.S. Pat. Nos. 3,248,179, 4,501,885, 5,565,175, 5,575,979, 6,239,235, 6,262,191 and 6,833,415, for example; each of which are herein incorporated by reference in their entirety.

Suitable diluents used in slurry polymerization include, but are not limited to, the monomer being polymerized and hydrocarbons that are liquids under reaction conditions. Examples of suitable diluents include, but are not limited to, hydrocarbons such as propane, cyclohexane, isobutane, n-butane, n-pentane, isopentane, neopentane, and n-hexane. Some loop polymerization reactions can occur under bulk conditions where no diluent is used. An example is polymerization of propylene monomer as disclosed in U.S. Pat. No. 5,455,314, which is incorporated by reference herein in its entirety.

According to yet another embodiment, the polymerization reactor may comprise at least one gas phase reactor. Such systems may employ a continuous recycle stream containing one or more monomers continuously cycled through a fluidized bed in the presence of the catalyst under polymerization conditions. A recycle stream may be withdrawn from the fluidized bed and recycled back into the reactor. Simultaneously, polymer product may be withdrawn from the reactor and new or fresh monomer may be added to replace the polymerized monomer. Such gas phase reactors may comprise a process for multi-step gas-phase polymerization of olefins, in which olefins are polymerized in the gaseous phase in at least two independent gas-phase polymerization zones while feeding a catalyst-containing polymer formed in a first polymerization zone to a second polymerization zone. One type of gas phase reactor is disclosed in U.S. Pat. Nos. 4,588,790, 5,352,749, and 5,436,304, each of which is incorporated by reference in its entirety herein.

According to still another embodiment, a high pressure polymerization reactor may comprise a tubular reactor or an autoclave reactor. Tubular reactors may have several zones where fresh monomer, initiators, or catalysts are added. Monomer may be entrained in an inert gaseous stream and introduced at one zone of the reactor. Initiators, catalysts, and/or catalyst components may be entrained in a gaseous stream and introduced at another zone of the reactor. The gas streams may be intermixed for polymerization. Heat and pressure may be employed appropriately to obtain optimal polymerization reaction conditions.

According to yet another embodiment, the polymerization reactor may comprise a solution polymerization reactor wherein the monomer is contacted with the catalyst composition by suitable stirring or other means. A carrier comprising an organic diluent or excess monomer may be employed. If desired, the monomer may be brought in the vapor phase into contact with the catalytic reaction product, in the presence or absence of liquid material. The polymerization zone is maintained at temperatures and pressures that will result in the formation of a solution of the polymer in a reaction medium. Agitation may be employed to obtain better temperature control and to maintain uniform polymerization mixtures throughout the polymerization zone. Adequate means are utilized for dissipating the exothermic heat of polymerization.

Polymerization reactors suitable for the present disclosure may further comprise any combination of at least one raw material feed system, at least one feed system for catalyst or catalyst components, and/or at least one polymer recovery system. Suitable reactor systems for the present disclosure may further comprise systems for feedstock purification, catalyst storage and preparation, extrusion, reactor cooling, polymer recovery, fractionation, recycle, storage, loadout, laboratory analysis, and process control.

Conditions that are controlled for polymerization efficiency and to provide polymer properties include, but are not limited to temperature, pressure, type and quantity of catalyst or co-catalyst, and the concentrations of various reactants. Polymerization temperature can affect catalyst productivity, polymer molecular weight and molecular weight distribution. Suitable polymerization temperatures may be any temperature below the de-polymerization temperature, according to the Gibbs Free Energy Equation. Typically, this includes from about 60° C. to about 280° C., for example, and/or from about 70° C. to about 110° C., depending upon the type of polymerization reactor and/or polymerization process.

Suitable pressures will also vary according to the reactor and polymerization process. The pressure for liquid phase polymerization in a loop reactor is typically less than 1000 psig (6.9 MPa). Pressure for gas phase polymerization is usually at about 200 psig (1.4 MPa)-500 psig (3.45 MPa). High pressure polymerization in tubular or autoclave reactors is generally run at about 20,000 psig (138 MPa); to 75,000 psig (518 MPa). Polymerization reactors can also be operated in a supercritical region occurring at generally higher temperatures and pressures. Operation above the critical point of a pressure/temperature diagram (supercritical phase) may offer advantages.

The concentration of various reactants can be controlled to produce polymers with certain physical and mechanical properties. The proposed end-use product that will be formed by the polymer and the method of forming that product may be varied to determine the desired final product properties. Mechanical properties include, but are not limited to tensile strength, flexural modulus, impact resistance, creep, stress relaxation and hardness tests. Physical properties include, but are not limited to density, molecular weight, molecular weight distribution, melting temperature, glass transition temperature, temperature melt of crystallization, density, stereoregularity, crack growth, short chain branching, long chain branching and rheological measurements.

The concentrations of monomer, co-monomer, hydrogen, co-catalyst, modifiers, and electron donors are generally important in producing specific polymer properties. Comonomer may be used to control product density. Hydrogen may be used to control product molecular weight. Co-catalysts may be used to alkylate, scavenge poisons and/or control molecular weight. The concentration of poisons may be minimized, as poisons may impact the reactions and/or otherwise affect polymer product properties. Modifiers may be used to control product properties and electron donors may affect stereoregularity.

Polymers such as polyethylene homopolymers and copolymers of ethylene with other mono-olefins may be produced in the manner described above using the LECs prepared as described herein. Polymer resins produced as disclosed herein may be formed into articles of manufacture or end use articles using techniques known in the art such as extrusion, blow molding, injection molding, fiber spinning, thermoforming, and casting. For example, a polymer resin may be extruded into a sheet, which is then thermoformed into an end use article such as a container, a cup, a tray, a pallet, a toy, or a component of another product. Examples of other end use articles into which the polymer resins may be formed include pipes, films, bottles, fibers, and so forth.

In an embodiment, a LEC prepared as disclosed herein results in a reduction in the level of volatile organic compounds (VOCs) produced during the catalyst preparation. For example, the VOCs may comprise hydrocarbons, aromatic compounds, alcohols, ketones, or combinations thereof. In an embodiment, the VOCs comprise alkenes, alternatively propylene, butene, ethylene, or combinations thereof. LECs produced as disclosed herein may be characterized by VOC emissions that are reduced by from about 50% to about 99% when compared to the emissions from an otherwise similar catalyst. Herein, an "otherwise similar catalyst" refers to a chromium silica-titania catalyst having been prepared using the same process, except without the addition of water in the amounts disclosed herein. Alternatively, emissions of VOCs from LECs prepared as disclosed herein are reduced by greater than about 50%, alternatively greater than about 75%, alternatively greater than about 90%, or alternatively greater than about 99% compared to an otherwise similar catalyst. In an embodiment, the VOC is an alcohol and the LEC has emissions of from about 50 wt. % to about 1 wt. % based on the weight of the LEC, alternatively less than about 20 wt. %, alternatively less than about 10 wt. %, or alternatively less than about 1 wt. %.

EXAMPLES

The following examples are given as particular embodiments of the disclosure and to demonstrate the practice and advantages thereof. It is understood that the examples are given by way of illustration and are not intended to limit the specification or the claims to follow in any manner.

Melt index (MI, g/10 min) was determined in accordance with ASTM D1238 at 190° C. with a 2,160 gram weight. The high load melt index (HLMI) of a polymer resin represents the rate of flow of a molten resin through an orifice of 0.0825 inch diameter when subjected to a force of 21,600 grams at 190° C. The HLMI values are determined in accordance with ASTM D1238 condition E.

Polymerizations were performed in 1.2 L isobutane at 100° C. and 550 psi of ethylene with 5 mL of 1-hexene and run to a productivity of 3200 g PE/g catalyst. The catalyst activity was determined by dividing the mass of polymer recovered from the reaction by the amount of catalyst used and by the active polymerization time.

Examples 1 and 2

Catalysts of the type disclosed herein were prepared and their catalytic properties investigated. Specifically, a first catalyst, designated I1 was prepared using silica gel (14.74 g) that had been dried at 180° C. and was weighed into a flask and placed under a positive pressure of dry nitrogen. Enough dry methanol was added to the silica to make a slurry. In a separate flask, basic chromium acetate (0.485 g, 0.8 wt. %) was dissolved in methanol and then added to the stirred slurry of silica gel. Neat Ti(OnPr)$_4$ (2.3 mL, 2.7 wt. %) was added dropwise to the stirred slurry of Cr/silica over 5-10 minutes, then the total mixture was allowed to stir for 15 minutes. The mixture was then heated to 100° C. for 16 hours to completely distill off the methanol and other volatiles. In the process of heating, water was added to the mixture (0.74 mL, 5 wt. %). After cooling, the dried pre-catalyst was charged to a 1.88 inch diameter activator tube. The pre-catalyst was then calcined in dry air (1.2-1.6 scfh) at 4° C./min to 650° C. and held at that temperature for 3 hours to form the active catalyst. A second catalyst, designated I2 was prepared using the method described for the preparation of I1 without the addition of water.

The catalysts were then used to prepare polymers. Polymerization runs were made in a 2.65 L stainless steel reactor equipped with a marine stirrer rotating at 500 rpm. The reactor was surrounded by a stainless steel jacket through which was circulated a stream of hot water, which permitted precise temperature control of the reactor to within half a degree centigrade, with the help of electronic control instrumentation. A small amount of the catalyst (0.05 to 0.10 g) was first charged to the reactor under dry nitrogen. Next, approximately 0.6 L of liquid isobutane was added, followed by 5 mL of 1-hexene and additional liquid isobutane to a total of 1.2 L and the reactor heated to the 100° C. set temperature. Ethylene was then added to the reactor, which was maintained at 550 psi throughout the course of the experiment. The reactor was run to a productivity of 3200 g·polyethylene/g·catalyst as determined by the flow controllers of the reactor instrumentation based on ethylene flow to the reactor. After the allotted productivity, the ethylene flow to the reactor was stopped and the reactor slowly depressurized and opened to recover the granular polymer powder. Dry powder was then removed and weighed. Activity was determined from the dry powder weight and the measured time. The HLMI and MI of the polymers produced from these catalysts were determined and are presented in Table 1.

TABLE 1

| Catalyst | Activity (g/g/h) | HLMI | MI |
|---|---|---|---|
| I1 | 4923 | 16.43 | 0.49 |
| I2 | 4624 | 18.00 | 0.44 |

These two runs show that the addition of water after the Ti addition did not harm the activity or melt index potential of the polymer prepared from the catalyst. However, the addition of water did remove undesirable volatiles during later calcination, as shown in the next example.

Example 3

A dried Cr/silica-titania pre-catalyst (15.87 g) as prepared in example 12 was slurried in MeOH (~50 mL). To the slurry of Cr/silica-titania was added water (0.8 mL) and the mixture allowed to stir for 30 min. The mixture was then heated to 100° C. overnight to remove volatile components by distillation and was designated I3.

The dried pre-catalyst treated with water (I3) was compared by TGA to the same dried pre-catalyst that did not receive water treatment (C1, The FIGURE), and it can be seen that I3 treated with water contains significantly less volatile organic material than C1. Both the water treated (I3) and control (C1) pre-catalyst were then activated by calcination in dry air (1.2-1.6 scfh) at 4° C./min to 650° C. for 3 hours to form the active catalyst.

Polymerization results, shown in the table below, again demonstrate no significant loss in activity or MI potential from this additional water treatment, as seen in Table 2.

TABLE 2

| Catalyst | Activity (g/g/h) | HLMI | MI |
|---|---|---|---|
| I3 | 5476 | 12.01 | 0.24 |
| C1 | 5563 | 10.65 | 0.21 |

Example 4

The solubility of alkyl titanates utilized in the preparation of LECs was investigated. To a dry flask under an atmosphere of nitrogen was added 625 mg of basic chromium acetate and 30 mL of isopropanol. The mixture was heated to 78° C. for one hour in order to dissolve the chromium, which remained in solution upon cooling. After cooling the resulting green solution to room temperature, 2.8 mL of Ti(OiPr)$_4$ was added with stirring. The solution remained homogeneous for several hours before being used in the preparation of a Cr/silica-titania catalyst.

Basic chromium acetate (625 mg) and 30 mL of methanol at room temperature was added to a dry flask under an atmosphere of nitrogen. The chromium readily dissolved to form a green homogeneous solution. To this solution was added 2.8 mL of Ti(OiPr)$_4$. Precipitation of a white solid was observed to begin after three minutes demonstrating that these titanium alkoxides are not soluble in methanol. While not wishing to be bound by theory, we believe that this is because of rapid exchange of alkoxy groups to form titanium methoxide groups.

Nevertheless methanol had fewer challenges, because of the ease with which it dissolves the chromium acetate, and because of its low boiling point, which makes the final catalyst easier to dry. Consequently, the use of methanol greatly stream-lines the production process. Table 3 below shows the boiling points of other non-aqueous solvents capable of dissolving the chromium salt.

TABLE 3

| Organic Solvent | Boiling Point |
|---|---|
| Methanol | 64.7° C. |
| Ethanol | 78.4° C. |
| Isopropanol | 82.6° C. |
| n-Propanol | 97.0° C. |
| Isobutanol | 108.0° C. |
| n-Butanol | 117.4° C. |

Example 5

A LEC of the type disclosed herein was prepared. Specifically, silica was dried at a temperature of from about 150° C. to 200° C. for 5 to 24 hours. The silica was then slurried in 2 to 3 times its own weight of dry methanol containing less than 0.1% water. The slurry was then cooled to less than 40° C. Optionally basic chromium acetate can be added to this slurry, but if temperature is raised to dissolve the Cr, then the slurry must be subsequently cooled before titanium addition. Titanium n-propoxide was then quickly added to the cooled slurry at high agitation rate to promote fast reaction and the mixture allowed to stir in the cooled state for 1 to 30 hours. Optionally basic chromium acetate can be added to this slurry at this point in the process. The temperature was then raised to 65° C. Water was then added during the heat-up in the amount of 2 to 10 mol per mole of titanium. The mixture was allowed to stir at 65° C. for 1 to 3 hours. Then the solvent, water, and n-propanol by-product were removed by distillation and the dried at 150° C. for 5 to 30 hours to generate a precatalyst. The precatalyst was subsequently calcined between 400° C. and 1000° C. to generate a catalyst.

ADDITIONAL DISCLOSURE

The following enumerated embodiments are provided as non-limiting examples.

A first embodiment which is a method comprising: a) drying a support material comprising silica at temperature in the range of from about 150° C. to about 220° C. to form a dried support; b) contacting the dried support with methanol to form a slurried support; c) subsequent to b), cooling the slurried support to a temperature of less than about 60° C. to form a cooled slurried support; d) subsequent to c), contacting the cooled slurried support with a titanium alkoxide to form a titanated support; and e) thermally treating the titanated support by heating to a temperature of equal to or greater than about 150° C. for a time period of from about 5 hours to about 30 hours to remove the methanol and yield a dried titanated support.

A second embodiment which is the method of the first embodiment further comprising the addition of a chromium-containing compound prior to the removal of methanol to form a precatalyst.

A third embodiment which is the method of any of the first through second embodiments further comprising the addition of water in an amount ranging from about 0.1 to about 10 moles per mole of titanium after addition of the titanium alkoxide.

A fourth embodiment which is the method of any of the second through third embodiments further comprising calcining the precatalyst at a temperature in the range of from about 400° C. to about 1000° C. for a time period of from about 30 minutes to about 24 hours to form a polymerization catalyst.

A fifth embodiment which is the method of any of the first through fourth embodiments wherein the silica is dried for a time period ranging from about 5 hours to about 24 hours and a weight loss on drying of the dried support is less than about 2 wt. %.

A sixth embodiment which is the method of any of the first through fifth embodiments wherein the methanol is present in an amount ranging from about 2 times to about 3 times the weight of the dried support.

A seventh embodiment which is the method of any of the first through sixth embodiments wherein the methanol has a water content of less than about 0.1 wt. %.

An eighth embodiment which is the method of any of the first through seventh embodiments wherein the silica is characterized by a surface area of from about 250 $m^2/g$ to about 1000 $m^2/g$ and a pore volume of greater than about 1.0 $cm^3/g$.

A ninth embodiment which is the method of any of the first through eighth embodiments wherein the titanium alkoxide comprises titanium n-propoxide.

A tenth embodiment which is the method of any of the first through ninth embodiments wherein the titanium alkoxide is present in an amount of from about 0.1 wt. % to about 10 wt. % by total weight of the catalyst.

An eleventh embodiment which is the method of any of the second through tenth embodiments wherein the chromium-containing compound comprises basic chromium acetate.

A twelfth embodiment which is the method of any of the second through eleventh embodiments wherein the chromium-containing compound is present in an amount of from about 0.1 wt. % to about 10 wt. % by total weight of the catalyst.

A thirteenth embodiment which is the method of any of the fourth through twelfth embodiments wherein an amount of volatile organic compounds (VOC) emitted during calcining at a temperature in the range of from about 400° C. to about 1000° C. for a time period of from about 30 minutes to about 24 hours is reduced by from about 50% to about 100% when compared to the amount of VOC emitted during calcining of an otherwise similar catalyst prepared without the addition of water.

A fourteenth embodiment which is the method of any of the fourth through the thirteenth embodiments wherein an amount of volatile organic compounds (VOC) emitted during calcining at a temperature in the range of from about 400° C. to about 1000° C. for a time period of from about 30 minutes to about 24 hours is less than about 2 wt. %.

A fifteenth embodiment which is a method comprising a) drying a silica support material at temperature in the range of from about 150° C. to about 220° C. to form a dried support; b) contacting the dried support with a solution comprising methanol containing less than 0.1 wt. % water and basic chromium acetate to form a chrominated, slurried support; c) cooling the chrominated, slurried support to a temperature of less than about 60° C. to form a cooled slurried support; d) contacting the cooled slurried support with titanium n-propoxide to form a titanated slurried support; e) thermally treating the titanated slurried support by increasing the temperature of the titanated support to 60° C. to 70° C.; f) prior to complete removal of methanol, contacting the titanated slurried support with water in an amount ranging from about 0.1 moles to about 10 moles per mole of titanium to produce a mixture; g) thermally treating the mixture by heating the mixture to a temperature of about 150° C. to about 220° C. for a time period of from about 5 hours to about 30 hours to form a precatalyst; and h) calcining the precatalyst at a temperature in the range of from about 400° C. to about 1000° C. for a time period of from about 30 minutes to about 24 hours to form a polymerization catalyst.

A sixteenth embodiment which is the method of the fifteenth embodiment wherein the support is dried to a weight loss on drying of less than about 2 wt. %, an amount of chromium is from about 0.5 wt. % to about 1.5 wt. % based on a total weight of the polymerization catalyst, an amount of titanium is from about 1 wt. % to about 5 wt. % based on a total weight of the polymerization catalyst, and the amount of water added in step f) is from about 2 moles to about 5 moles per mole of titanium.

A seventeenth embodiment which is the method of any of the fifteenth through sixteenth embodiments wherein the precatalyst is calcined at a temperature in the range of from about 500° C. to about 700° C. for a time period of from about 4 hours to about 12 hours.

An eighteenth embodiment which is a method comprising: a) drying a silica support at temperature in the range of from about 150° C. to about 220° C. to form a dried support; b) contacting the dried support with a chromium-containing compound to form a chrominated support; c) contacting the chrominated support with a solvent to form a slurried support; d) cooling the slurried support to a temperature of less than about 60° C. to form a cooled support; e) contacting the cooled support with a titanium-containing compound to form a titanated support; f) thermally treating the titanated support by increasing the temperature of the titanated support to the boiling point of the solvent; g) prior to reaching the boiling point of the solvent, contacting the titanated support with water in an amount ranging from about 0.1 moles to about 10 moles per mole of titanium to produce a mixture; h) thermally treating the mixture by heating the mixture to a temperature of about 150° C. for a time period of from about 5 hours to about 30 hours to form a precatalyst; and i) calcining the precatalyst at a temperature in the range of from about 400° C. to about 1000° C. for a time period of from about 30 minutes to about 24 hours to form a polymerization catalyst A nineteenth embodiment which is the method of the eighteenth embodiment wherein the solvent comprises methanol having less than about 0.1 wt. % water.

A twentieth embodiment which is the method of any of the eighteenth through nineteenth embodiments wherein the titanium-containing compound comprises titanium n-propoxide.

A twenty-first embodiment which is the method of any of the eighteenth through twentieth embodiments wherein the silica support is characterized by a surface area of from about 250 $m^2/g$ to about 1000 $m^2/g$ and a pore volume of greater than about 1.0 $cm^3/g$.

A twenty-second embodiment which is a method comprising a) drying a support material at temperature in the range of from about 150° C. to about 220° C. to form a dried support; b) contacting the dried support with a solvent to form a slurried support; c) subsequent to b), cooling the slurried support to a temperature of less than about 50° C. to form a cooled support; d) contacting the cooled support with a titanium-containing compound to form a titanated support; e) contacting the titanated support with a chromium-containing compound to form a chrominated support; f) thermally treating the chrominated support by increasing the temperature of the chrominated support to the boiling point of the solvent; g) prior to reaching the boiling point of the solvent, contacting the chrominated support with water in an amount ranging from about 0.1 moles to about 10 moles per mole of titanium to produce a mixture; and h) thermally treating the mixture by heating the mixture to a temperature of equal to or greater than about 150° C. for a time period of from about 5 hours to about 30 hours to yield a precatalyst.

A twenty-third embodiment which is the method of the twenty-second embodiment further comprising calcining the precatalyst at a temperature in the range of from about 400° C. to about 1000° C. for a time period of from about 30 minutes to about 24 hours to form a polymerization catalyst.

A twenty-fourth embodiment which is the method of any of the twenty-second through twenty-third embodiments wherein the silica is dried for a time period ranging from about 5 hours to about 24 hours.

A twenty-fifth embodiment which is the method of any of the twenty-second through twenty-fourth embodiments wherein the solvent is present in an amount ranging from about 2 times to about 3 times the weight of the dried support.

A twenty-sixth embodiment which is the method of any of the twenty-second through twenty-fifth embodiments wherein step (d) is performed under mixing conditions for efficient dispersal of the titanium alkoxide.

A twenty-seventh embodiment which is the method of any of the twenty-second through twenty-sixth embodiments wherein the solvent comprises methanol having a water content of less than about 0.1 wt. %.

A twenty-eighth embodiment which is the method of any of the twenty-second through twenty-seventh embodiments wherein the support material comprises silica.

A twenty-ninth embodiment which is the method of the twenty-eighth embodiment wherein the silica is characterized by a surface area of from about 250 $m^2/g$ to about 1000 $m^2/g$ and a pore volume of greater than about 1.0 $cm^3/g$.

A thirtieth embodiment which is the method of any of the twenty-second through twenty-ninth embodiments wherein the titanium-containing compound comprises titanium n-propoxide.

A thirty-first embodiment which is the method of any of the twenty-second through thirtieth embodiments wherein the titanium-containing compound is present in an amount of from about 0.1 wt. % to about 10 wt. % by total weight of the catalyst.

A thirty-second embodiment which is the method of any of the twenty-second through thirty-first embodiments wherein the chromium-containing compound comprises basic chromium acetate.

A thirty-third embodiment which is the method of the thirty-second embodiment wherein the chromium-containing compound is present in an amount of from about 0.1 wt. % to about 10 wt. % by total weight of the catalyst.

A thirty-fourth embodiment which is a method comprising a) drying a support material at temperature in the range of from about 150° C. to about 220° C. to form a dried support; b) contacting the dried support with a solvent to form a slurried support; c) subsequent to b), cooling the slurried dried support to a temperature of less than about 50° C. to form a cooled support; d) contacting the cooled support with a chromium-containing compound to form a chrominated support; e) contacting the chrominated support with a titanium-containing compound to form a titanated support; f) thermally treating the titanated support by increasing the temperature of the titanated support to the boiling point of the solvent; g) prior to reaching the boiling point of the solvent, contacting the titanated support with water in an amount ranging from about 0.1 moles to about 10 moles per mole of titanium to produce a mixture; and h) thermally treating the mixture by heating the mixture to a temperature equal to or greater than about 150° C. for a time period of from about 5 hours to about 30 hours to yield a precatalyst.

A thirty-fifth embodiment which is the method of the thirty-fourth embodiment further comprising calcining the precatalyst at a temperature in the range of from about 400° C. to about 1000° C. for a time period of from about 30 minutes to about 24 hours to form a polymerization catalyst.

A thirty-sixth embodiment which is the method of any of the thirty-fourth through thirty-fifth embodiments wherein the solvent comprises methanol having less than about 0.1 wt. % water.

A thirty-seventh embodiment which is the method of any of the thirty-fourth through thirty-sixth embodiments wherein the support material comprises silica.

A thirty-eighth embodiment which is the method of the thirty-seventh embodiment wherein the silica is characterized by a surface area of from about 250 $m^2/g$ to about 1000 $m^2/g$ and a pore volume of greater than about 1.0 $cm^3/g$.

A thirty-ninth embodiment which is the method of any of the thirty-fourth through thirty-eighth embodiments wherein the titanium-containing compound comprises titanium n-propoxide.

A fortieth embodiment which is the method of any of the thirty-fourth through thirty-ninth embodiments wherein the titanium-containing compound is present in an amount of from about 0.1 wt. % to about 10 wt. % by total weight of the catalyst.

A forty-first embodiment which is the method of any of the thirty-fourth through fortieth embodiments wherein the chromium-containing compound comprises chromium (III) acetate hydroxide.

A forty-second embodiment which is the method of any of the thirty-fourth through forty-first embodiments wherein the chromium-containing compound is present in an amount ranging from about 0.1 wt. % to about 10 wt. % by total weight of the catalyst.

A forty-third embodiment which is a method comprising a) drying a silica support material at temperature in the range of from about 150° C. to about 220° C. to form a dried support; b) contacting the dried support with a chromium-containing compound to form a chrominated support; c) contacting the chrominated support with a solvent to form a slurried support; d) cooling the slurried support to a temperature of less than about 50° C. to form a cooled support; e) contacting the cooled support with a titanium-containing compound to form a titanated support; f) thermally treating the titanated support by increasing the temperature of the titanated support to the boiling point of the solvent; g) prior to reaching the boiling point of the solvent, contacting the titanated support with water in an amount ranging from about 0.1 moles to about 10 moles per mole of titanium to produce a mixture; h) thermally treating the mixture by heating the mixture to a temperature of equal to or greater than about 150° C. for a time period of from about 5 hours to about 30 hours to form a precatalyst; and i) calcining the precatalyst at a temperature in the range of from about 400° C. to about 1000° C. for a time period of from about 30 minutes to about 24 hours to form a polymerization catalyst A forty-fourth embodiment which is a method comprising a) drying a silica support material at temperature in the range of from about 150° C. to about 220° C. to form a dried support; b) contacting the dried support with a solvent to form a slurried support; c) contacting the slurried dried support with a chromium-containing compound to form a chrominated support; d) subsequent to c), cooling the chrominated support to a temperature of less than about 50° C. to form a cooled support; e) contacting the cooled support with a titanium-containing compound to form a titanated support; f) thermally treating the titanated support by increasing the temperature of the titanated support to the boiling point of the solvent; g) prior to reaching the boiling point of the solvent, contacting the titanated support with water in an amount ranging from about 0.1 moles to about 10 moles per mole of titanium to produce a mixture; h) thermally treating the mixture by heating the mixture to a temperature of equal to or greater than about 150° C. for a time period of from about 5 hours to about 30 hours to form a precatalyst; and i) calcining the precatalyst at a temperature in the range of from about 400° C. to about 1000° C. for a time period of from about 30 minutes to about 24 hours to form a polymerization catalyst.

A forty-fifth embodiment which is a method comprising a) obtaining a chromium-silica-titania polymerization catalyst; b) slurrying the chromium-silica-titania catalyst in methanol wherein the methanol contains less than about 0.1 wt. % water to produce a slurried catalyst; c) cooling the slurried catalyst to a temperature of less than about 50° C. to produce a cooled slurried catalyst; d) thermally treating the cooled slurried catalyst by increasing the temperature of the cooled support to the boiling point of the solvent; e) prior to reaching the boiling point of the solvent, contacting the cooled slurried catalyst with water in an amount ranging from about 0.1 moles to about 10 moles per mole of titanium to produce a mixture; f) thermally treating the mixture by heating the mixture to a temperature of equal to or greater than about 150° C. for a time period of from about 5 hours to about 30 hours to form a precatalyst; and g) calcining the precatalyst at a temperature in the range of from about 400° C. to about 1000° C. for a time period of from about 30 minutes to about 24 hours to form a polymerization catalyst.

A forty-sixth embodiment which is the method of the forty-fifth embodiment wherein an amount of volatile organic compounds (VOC) emitted during the calcining is reduced by from about 50% to about 100% when compared to the amount of VOC emitted during calcining of an otherwise similar catalyst.

A forty-seventh embodiment which is a method comprising a) drying a silica support material at temperature in the range of from about 150° C. to about 220° C. to form a dried support; b) contacting the dried support with a solvent comprising a chromium-containing compound to form a chrominated, slurried support; c) cooling the chrominated, slurried support to a temperature of less than about 50° C. to form a cooled support; d) contacting the cooled support with a titanium-containing compound to form a titanated support; e) thermally treating the titanated support by increasing the temperature of the titanated support to the boiling point of the solvent; f) prior to reaching the boiling point of the solvent, contacting the titanated support with water in an amount ranging from about 0.1 moles to about 10 moles per mole of titanium to produce a mixture; g) thermally treating the mixture by heating the mixture to a temperature of equal to or greater than about 150° C. for a time period of from about 5 hours to about 30 hours to form a precatalyst; and h) calcining the precatalyst at a temperature in the range of from about 400° C. to about 1000° C. for a time period of from about 30 minutes to about 24 hours to form a polymerization catalyst.

A forty-eighth embodiment which is the method of the first embodiment further comprising, prior to the conclusion of step (e), wherein the conclusion of step (e) results in the removal of methanol from the support, adding a chromium-containing compound to the support to form a precatalyst.

A forty-ninth embodiment which is the method of the forty-eighth embodiment further comprising, prior to, during, or after any one or more of steps (a)-(e), adding a chromium-containing compound to the support to form a precatalyst.

While various embodiments have been shown and described, modifications thereof can be made by one skilled in the art without departing from the spirit and teachings of the disclosure. The embodiments described herein are exemplary only, and are not intended to be limiting. Many variations and modifications of the disclosure disclosed herein are possible and are within the scope of the disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). Use of the term "optionally" with respect to any element of a claim is intended to mean that the subject element is required, or alternatively, is not required. Both alternatives are intended to be within the scope of the claim. Use of broader terms such as comprises, includes, having, etc. should be understood to provide support for narrower terms such as consisting of, consisting essentially of, comprised substantially of, etc.

Accordingly, the scope of protection is not limited by the description set out above but is only limited by the claims which follow, that scope including all equivalents of the subject matter of the claims. Each and every claim is incorporated into the specification as an embodiment of the present disclosure. Thus, the claims are a further description and are an addition to the embodiments of the present disclosure. The discussion of a reference in the disclosure is not an admission that it is prior art to the present disclosure, especially any reference that may have a publication date after the priority date of this application. The disclosures of all patents, patent applications, and publications cited herein are hereby incorporated by reference, to the extent that they provide exemplary, procedural or other details supplementary to those set forth herein.

What is claimed is:

1. A method comprising:
   a) drying a silica support material at a temperature in a range of from about 150° C. to about 220° C. to form a dried support;
   b) contacting the dried support with a solution comprising methanol containing less than 0.1 wt. % water and a basic chromium acetate to form a chrominated slurried support;

c) cooling the chromated slurried support to a temperature of less than about 60° C. to form a cooled slurried support;

d) contacting the cooled slurried support with a titanium n-propoxide to form a titanated slurried support;

e) thermally treating the titanated slurried support by increasing the temperature of the titanated slurried support to 60° C. to 70° C.;

f) prior to complete removal of methanol, contacting the titanated slurried support with water in an amount ranging from about 0.1 moles to about 10 moles per mole of titanium to produce a mixture;

g) thermally treating the mixture by heating the mixture to a temperature of about 150° C. to about 220° C. for a time period of from about 5 hours to about 30 hours to form a precatalyst; and h) calcining the precatalyst at a temperature in the range of from about 400° C. to about 1000° C. for a time period of from about 30 minutes to about 24 hours to form a polymerization catalyst.

2. The method of claim 1 wherein the silica support is dried to a weight loss on drying of less than about 2 wt. %.

3. The method of claim 1 wherein calculating the precatalyst at the temperature in the range of from about 500° C. to about 700° C. for the time period of from about 4 hours to about 12 hours.

4. The method of claim 1 wherein the silica support is characterized by a surface area of from about 250 $m^2/g$ to about 1000 $m^2/g$.

5. The method of claim 1 wherein the silica support material contains greater than about 50% silica.

6. The method of claim 1 wherein step b) is repeated from about 2 to about 10 times.

7. The method of claim 1 wherein the silica support material is dried in an inert atmosphere.

8. The method of claim 1 wherein the silica support material is dried for a time period ranging from about 5 hours to about 24 hours.

9. The method of claim 1 wherein calcining the precatalyst in air, oxygen, inert gases, carbon monoxide or a combination thereof.

10. The method of claim 1 wherein an amount of chromium is from about 0.5 wt. % to about 1.5 wt. % based on a total weight of the polymerization catalyst.

11. The method of claim 1 wherein an amount of titanium is from about 1 wt. % to about 5 wt. % based on a total weight of the polymerization catalyst.

12. The method of claim 1 wherein the silica support material is present an amount of from about 50 wt. % to about 99 wt. %; based on a total weight of the polymerization catalyst.

13. The method of claim 1 wherein the silica support material is characterized by a pore volume of from about 1.0 $cm^3$/gram to about 2.5 $cm^3$/gram.

14. The method of claim 1 wherein the amount of water added in step f) is from about 2 moles to about 5 moles per mole of titanium.

15. The method of claim 1 wherein the methanol is contacted with the dried support in an amount ranging from about 2 times to about 3 times the weight of the dried support.

16. The method of claim 1 wherein an amount of volatile organic compounds (VOC) emitted during the calcining is reduced by from about 50% to about 100% when compared to the amount of VOC emitted during calcining of a similar precatalyst prepared without the addition of water to the titanated slurried support.

17. The method of claim 1 wherein an amount of volatile organic compounds (VOC) emitted during calcining is less than about 2 wt. %.

18. The method of claim 1 wherein step d) comprises stirring at ambient temperature for a time period ranging from about 5 minutes to about 30 hours.

19. The method of claim 1 wherein step d) is performed under mixing conditions for efficient dispersal of the titanium n-propoxide.

* * * * *